Aug. 13, 1929.  R. RAPELLIN  1,724,616
GREASE GUN
Filed Aug. 31, 1927
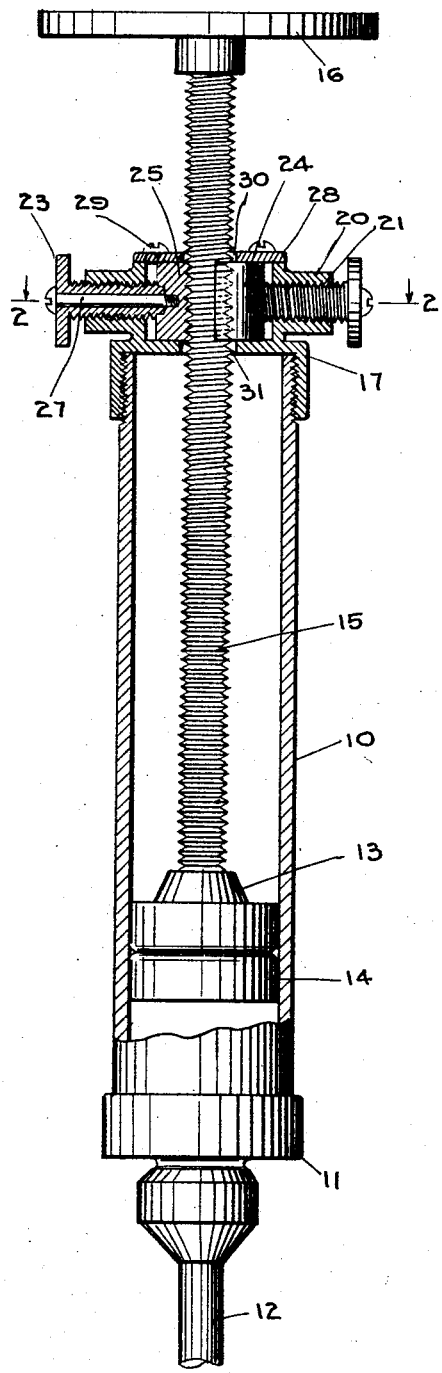
FIG. 1
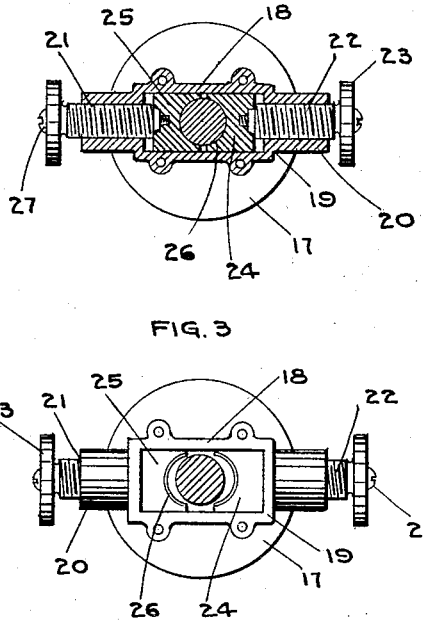
FIG. 2
FIG. 3
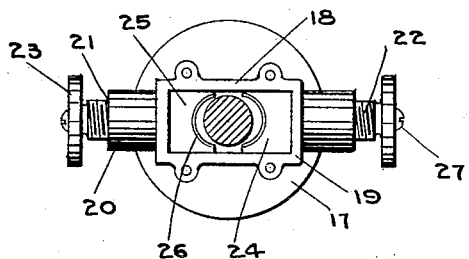
FIG. 4
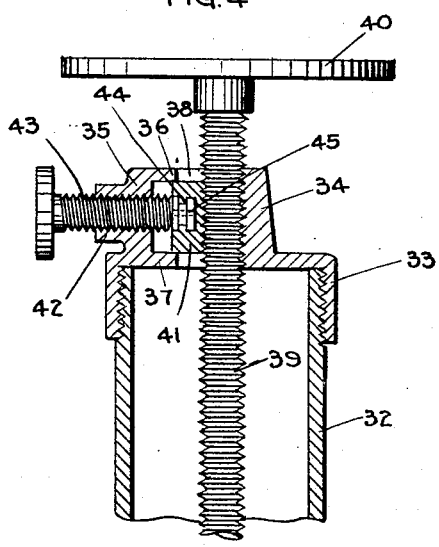
INVENTOR
RENÉ RAPELLIN
BY Hazard and Miller
ATTORNEYS Patented Aug. 13, 1929.

1,724,616

UNITED STATES PATENT OFFICE.

RENÉ RAPELLIN, OF LOS ANGELES, CALIFORNIA.

GREASE GUN.

Application filed August 31, 1927. Serial No. 216,552.

This invention relates to improvements in grease guns and the like.

An object of the invention is to provide an improved grease gun wherein there is a cylinder constituting a container for grease or other lubricant in which is reciprocable a piston having a threaded piston rod which is adapted to be rotated to advance the piston so as to develop pressure within the cylinder to discharge grease or lubricant therefrom.

The threaded piston rod is employed to develop the desired mechanical advantage so as to discharge the lubricant under the desired pressure. In prior devices where such a construction is employed, it is necessary to reversely rotate the piston rod on refilling so as to position the piston at the top of the cylinder. This requires a considerable amount of time and labor, and it is an object of this invention to provide an improved grease gun whereon on refilling, the threaded engagement between the piston rod and the cylinder can be disconnected so that the piston and piston rod can be shifted bodily with respect to the cylinder, so that the piston will be positioned at the top of the cylinder above the new supply of lubricant.

Another object of the invention is to provide an improved grease gun wherein there is a cylinder, a piston and threaded piston rod which can be used for discharging a heavy grease or a light oil as a lubricant. When a heavy grease is being used, the piston rod is placed in threaded engagement with the cylinder or container so that a considerable mechanical advantage is developed to discharge the grease. When a light lubricating oil is used, such mechanical advantage is not necessary and the improved grease gun contemplates disconnecting the threaded engagement between the piston rod and cylinder so that the piston can be reciprocated or advanced by hand sufficient pressure to discharge, the oil being capable of being developed in this manner.

With the foregoing and other objects in view which will be made manifest in the following detailed description and specifically pointed out in the appended claims, reference is had to the accompanying drawings for an illustrative embodiment of the invention wherein:

Figure 1 is a view in elevation of the improved grease gun, parts being broken away and shown in vertical section.

Fig. 2 is a horizontal section taken substantially along the line 2—2 upon Figure 1, illustrating the device in the position wherein the threaded piston rod is in threaded engagement with the cylinder or container.

Fig. 3 is a view similar to Figure 2, illustrating the threaded engagement between the cylinder and piston rod as having been disconnected.

Fig. 4 is a partial view in vertical section illustrating a slightly modified form of construction.

Referring to the accompanying drawings wherein similar reference characters designate similar parts throughout, the improved grease gun consists of a cylinder 10 having a bottom 11 to which may be connected a hose 12 through which the lubricant from the cylinder is discharged. A piston 13 having opposed cup leathers 14 or their equivalent, is reciprocable in the cylinder and adapted to be actuated by a threaded piston rod 15 having a handle 16. A cover 17 is threaded onto the upper end of the cylinder 10 so that it may be removed, permitting the cylinder to be refilled with lubricant. On this cover there is formed a rectangular container or cup having side walls 18 and end walls 19. Bosses 20 are formed upon the end walls and have apertures 21 drilled and tapped in them to receive adjusting screws 22 having heads 23. Two blocks 24 and 25 are positioned within the cup and are slidable between the side walls 18. They present toward each other, semicylindrical surfaces 26 which are threaded with threads complementary to the threads on the piston rod 15. The adjusting screws 22 are hollow and bolts 27 extend through them and are screwed into the blocks 24 and 25, the heads of these bolts bearing against the outer sides of the heads 23. In this manner the adjusting screws 22 can be rotated upon the bolts 27 and advanced or retracted within the bosses 20 so as to advance or retract the blocks 24 or 25. The bolts 27 serve to form a swiveled connection between the screws 22 and the blocks. The blocks are kept within the cup-shaped container on the cover 17 by a plate 28 fastened in place by means of screws 29. Apertures 30 and 31 are formed in the plate and the portion of the cover which provides the top of the cylinder 10 respectively, and these apertures are of a greater diameter than the diameter of the piston rod 15.

If the container is filled with a heavy lubricant such as grease, the blocks 24 and 25 are moved toward each other by the adjusting screws 22 so that they form a threaded engagement between the top of the cylinder 10 and the piston rod. In such position, on rotating the piston rod 15 by the handle 16, the piston will be slowly advanced to force the grease from the container. When it is desired to refill the container 10 the adjusting screws 22 are rotated so as to retract the blocks 24 and 25 out of engagement with the piston rod 15, and in such position the piston rod and piston can be lifted bodily by the handle 16, the piston rod merely sliding through the apertures 30 and 31. The cover can then be removed and the container 10 refilled with grease, and on reapplication of the cover 17 the adjusting screws 22 can be rotated to advance the blocks 24 and 25 into engagement with the piston rod so that the piston rod can be rotated to force the piston downwardly as before. If it is desired to use the improved grease gun for discharging a light lubricating oil and it is believed that sufficient pressure can be developed by hand to discharge the oil from the cylinder 10, the blocks 24 and 25 can be left in their retracted positions and the piston can be forced downwardly by applying force to the handle 16.

In Figure 4 there is illustrated a slightly modified form of construction consisting of a barrel 32 having a threaded cover 33 on which is formed two end walls 34 and 35 connected by a top wall 36 and a bottom wall 37. In the top and bottom walls 36 and 37 there are formed oblong slots 38 through which extends the threaded piston rod 39 having the handle 40. There are no side walls so that a block 41 can be slipped between the top and bottom walls 36 and 37. The end wall 34 and the block 41 present toward each other semi-cylindrical surfaces which are threaded and which are adapted to engage the threads on the piston rod 39. The end wall 35 has a boss 42 formed upon it through which extends a threaded aperture receiving an adjusting screw 43 which has its inner end 44 shallow or provided with an annular groove and extending into a recess in the block 41. A pin 45 extends through the block and into the groove, forming the swiveled connection between the adjusting screw 43 and the block. This modification has the same operation and advantages as the construction disclosed in Figure 1. In the position shown upon the drawing the piston on the piston rod 39 can be advanced by rotating the piston rod by the handle 40. When it is desired to disconnect the threaded engagement between the cylinder 32 and the piston rod 39, the adjusting screw 43 is rotated so as to retract the block 41 after which the piston rod 39 can be swung over into the center of the slots 38 and out of engagement with the end wall 34. In such position it can be reciprocated or moved without rotation being required.

From the above described construction it will be appreciated that a novel grease gun has been provided which facilitates the refilling and the placing of the piston in the position for further reciprocating. The improved grease gun also is so constructed that it may be used either as a grease gun by screwing down the piston against the grease, or as an oil gun by forcing the piston downwardly within the cylinder without rotation.

It will be understood that various changes in the details of construction may be made without departing from the spirit or scope of the invention as defined by the appended claims.

I claim:

1. A construction associated with a feed screw comprising a slidable block having threads complementary to the threads on the screw, guide means for guiding the block toward or away from the screw, an adjusting screw having a swivel connection with the block, and means in which the adjusting screw is threadedly mounted whereby upon rotation of the adjusting screw the block will be forced into or out of engagement with the feed screw.

2. A construction associated with a feed screw comprising slidable blocks, each of which has threads complementary to the threads on the screw, guide means for guiding the blocks toward or away from the screw, adjusting screws having swiveled connections with the blocks, and means in which the adjusting screws are threadedly mounted whereby upon rotation of the adjusting screws the blocks will be forced into or out of engagement with the feed screw.

3. A construction associated with a feed screw comprising slidable blocks having threads complementary to the threads on the screw, guide means for guiding the blocks toward or away from the screw, means in which the adjusting screws are threadedly mounted, bolts extending through the adjusting screws and fastened to the blocks on which the adjusting screws are rotatable and providing a swiveled connection between the adjusting screws and the blocks whereby upon rotation of the adjusting screws the blocks will be forced into or out of engagement with the feed screw.

In testimony whereof I have signed my name to this specification.

RENÉ RAPELLIN.